(12) United States Patent
Singer

(10) Patent No.: US 9,317,173 B2
(45) Date of Patent: Apr. 19, 2016

(54) METHOD AND SYSTEM FOR PROVIDING CONTENT BASED ON LOCATION DATA

(71) Applicants: Sony Corporation, Tokyo (JP); Sony Pictures Entertainment Inc., Culver City, CA (US)

(72) Inventor: Mitch Singer, Los Angeles, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 234 days.

(21) Appl. No.: 13/792,352

(22) Filed: Mar. 11, 2013

(65) Prior Publication Data

US 2014/0129949 A1 May 8, 2014

Related U.S. Application Data

(60) Provisional application No. 61/721,992, filed on Nov. 2, 2012.

(51) Int. Cl.
| | |
|---|---|
| G06F 3/0484 | (2013.01) |
| G06F 3/0481 | (2013.01) |
| G01C 21/04 | (2006.01) |
| G06Q 30/02 | (2012.01) |
| H04L 29/08 | (2006.01) |
| G11B 27/28 | (2006.01) |
| H04N 21/258 | (2011.01) |
| G06F 17/30 | (2006.01) |
| H04W 4/02 | (2009.01) |
| H04N 21/414 | (2011.01) |
| H04N 21/478 | (2011.01) |
| G11B 27/031 | (2006.01) |
| G01C 21/36 | (2006.01) |
| H04N 21/8549 | (2011.01) |

(52) U.S. Cl.
CPC .............. *G06F 3/0481* (2013.01); *G01C 21/04* (2013.01); *G01C 21/3697* (2013.01); *G06F 17/3087* (2013.01); *G06Q 30/02* (2013.01); *G11B 27/031* (2013.01); *G11B 27/28* (2013.01); *H04L 67/18* (2013.01); *H04N 21/25841* (2013.01); *H04N 21/41407* (2013.01); *H04N 21/47815* (2013.01); *H04W 4/021* (2013.01); *H04N 21/8549* (2013.01)

(58) Field of Classification Search
CPC ........... G06Q 30/0261; G06Q 30/0631; G06F 17/30781; G06F 17/05; G06T 19/006
See application file for complete search history.

(56) References Cited

U.S. PATENT DOCUMENTS

| | | | |
|---|---|---|---|
| 7,319,780 B2 * | 1/2008 | Fedorovskaya et al. | ...... 382/128 |
| 7,933,338 B1 | 4/2011 | Choudhry et al. | |

(Continued)

FOREIGN PATENT DOCUMENTS

| | | |
|---|---|---|
| DE | 102010042313 | 4/2012 |
| WO | 2012/004622 | 7/2010 |
| WO | 2012/007764 | 7/2011 |

*Primary Examiner* — Namitha Pillai
(74) *Attorney, Agent, or Firm* — Mark D. Wieczorek; Mayer & Williams PC

(57) ABSTRACT

Apparatus and methods are provided to implement a technique for using location information to identify and select movies or other content. In one implementation, an application for a device such as a smart phone or tablet computer uses location information to identify a movie that corresponds to the location, e.g., by fictional location or by where shots were filmed. Variations leverage the combination of user or target physical location and location information from a movie.

32 Claims, 15 Drawing Sheets

(56) References Cited

U.S. PATENT DOCUMENTS

2011/0063325 A1* 3/2011 Saunders ............... 345/639
2012/0310784 A1 12/2012 Bartley et al.
2013/0281209 A1* 10/2013 Lyons et al. ............... 463/33
2014/0095063 A1* 4/2014 Saraswat ............... 701/410
2014/0162695 A1* 6/2014 Jeon ............... 455/456.3
2014/0200060 A1* 7/2014 Wu et al. ............... 463/5

* cited by examiner

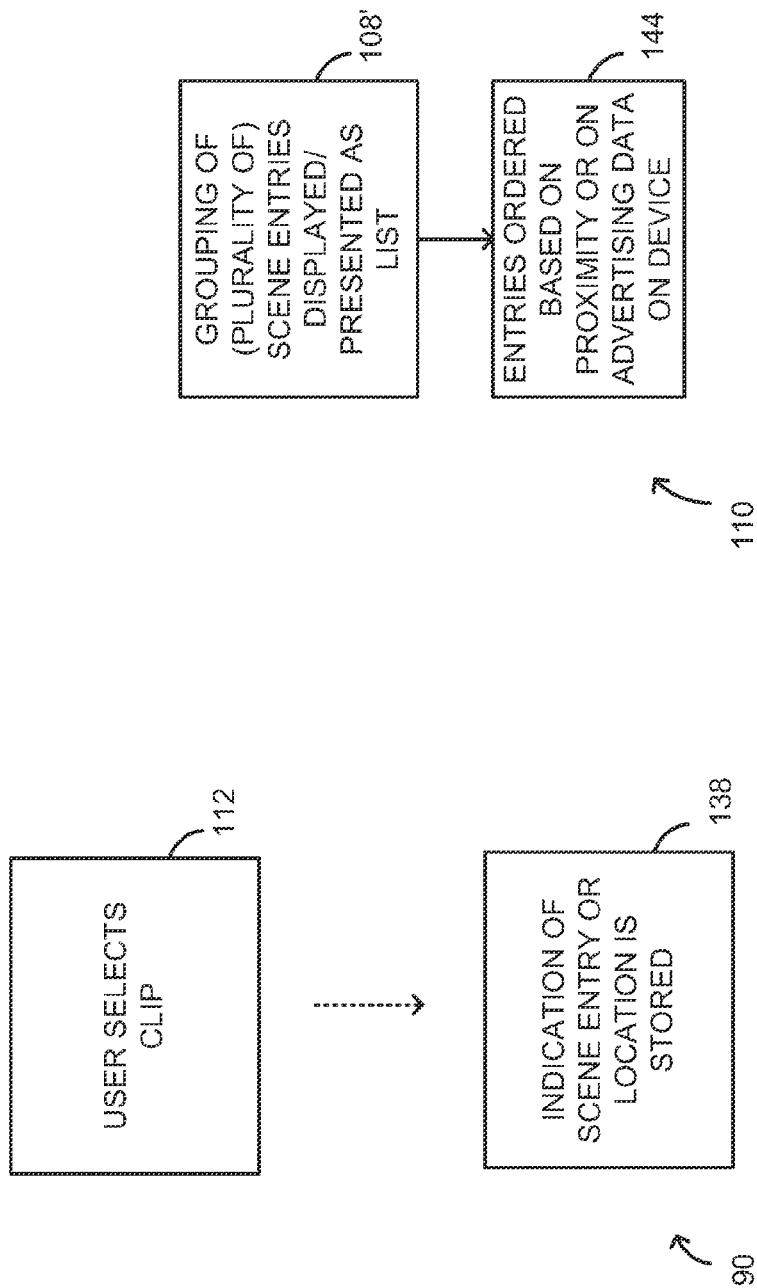

METHOD AND SYSTEM FOR PROVIDING CONTENT BASED ON LOCATION DATA

CROSS-REFERENCE TO RELATED APPLICATIONS

This patent application claims benefit of priority from U.S. Provisional Patent Application Ser. No. 61/721,992, entitled "Location Based Movie App", filed Nov. 2, 2012, owned by the assignee of the present application and incorporated by reference herein in its entirety.

BACKGROUND

The popularity of movies and the popularity of sites such as IMDB clearly evidences the public's interest in motion pictures, and in particular the public's interest in the history of motion pictures, trivia about motion pictures, and curiosity about how motion pictures are made. Even tour guides and travel publications on occasion take note of where motion pictures take place or have been filmed, and certain spots are even pilgrimage sites for fans of a given feature.

However, if a traveler has journeyed to a number of destinations on a trip, the traveler may not be aware of filming locations or film settings along the way. Moreover, even if the traveler is aware of the location of a scene, there is no easy way to engage in e-commerce to purchase the related asset.

Accordingly, there is a need for a better way to inform travelers of locations relevant to motion pictures or other media, as well as for a way to allow a traveler, so informed, to purchase an associated asset.

SUMMARY

Systems and methods according to principles disclosed here meet a dual purpose of providing consumers with the ability to purchase media content related to geographic locations, as well as to inform them of the existence of media relative to a target or current location. Moreover, current systems and methods provide a way to promote media to travelers or other people based on their location, or on an entered location. In one implementation, a software application or computer system uses location information to identify assets or scenes that relate to a specific location. The user can then access content or information for those assets or scenes.

In one aspect, the invention is directed towards a method for selecting scene clips, including: determining a current location of a device; sending the current location to a server; and receiving and displaying at least one scene entry pertaining to the current location from the server, where the displayed scene entry indicates a name of an asset and a scene from the asset and where the scene entry has an associated scene location.

Implementations of the invention may include one or more of the following. The method may further include: sending a request to the server for a clip for the scene; receiving data for the requested clip; and displaying the clip through the device. The method may further include storing an indication of the scene entry or scene location for which a request is sent in a database. The sending may be preceded by a step of receiving an input selecting a displayed scene entry. The asset may be an audiovisual work, and the clip may be streamed or downloaded to the device. The method may further include: displaying an image or clip from the scene entry; receiving visual data from a camera associated with the device; comparing the displayed image or clip with the received visual data; and providing feedback to a user about the difference between the received visual data and the displayed image or clip, whereby as a user adjusts the camera position to adjust the visual data, a difference between the displayed image or clip in the visual data may be minimized. The method may further include: displaying an image or clip from the scene entry; receiving visual data from a camera associated with the device; and providing a user interface using which an object or a person in the displayed image or clip may be replaced with, or superposed upon, an object or a person imaged by the visual data, or vice-versa. The method may further include displaying an outline indication on the user interface of at least one object or person from the displayed image or clip or of at least one object or person from the visual data. The asset may be a book or other print media, and the clip may be a textual excerpt from the book or other print media. The asset may also be a song, or the asset may be selected from the group consisting of: television programs, news programs, documentaries, video games, Internet media, Internet videos, social network media, and artwork. The method may further include: receiving an offer from the server to purchase the asset; and presenting the offer through the device. The method may further include: receiving user input indicating to accept the offer; sending an offer acceptance message to the server; and receiving an authorization code to download or stream data for the asset from a content server. The current location of the device may be determined using a GPS system of the device. Alternatively, the determining may be performed by analysis of transaction information on the device, or by receiving location information from an external device. The displayed scene entries may be ordered based on proximity to the device or based on advertising data received by the device, the advertising data associated with the scene entry or scene location. The device may be a smart phone or a tablet. The method may further include receiving a grouping of scene entries pertaining to the current location from the server, where the grouping of scene entries indicates names of assets, receiving a selection from the grouping, and transmitting the selection to the server. The grouping may be displayed as a list of scene entries or as a map indicating the scene locations. The list may be ordered according to a flow of scenes in the asset, or the map may indicate the flow of scenes in the asset. The method may further include displaying the grouping with travel information or directions indicated between scene locations. The method may further include receiving a distance threshold, and the displayed scene entries pertaining to the current location from the server may be filtered based on the distance threshold. The method may further include displaying an alert if the device is or becomes separated from the scene location by a distance less than the distance threshold. The method may further include receiving a distance threshold, and storing an indication of the scene entry or scene location in a database if the device is less than the distance threshold from a scene location. The method may further include providing a reward based on the contents of the database. The method may further include receiving a filter indication, and where the grouping is filtered based on the filter indication. The filter indication may be selected from the group consisting of: actor, genre, rating, date range, director, scene location, and combinations of the above, or the like. The method may further include augmenting the presented clip, such as where the augmenting includes adding an image or text to the presented clip. The method may further include posting an indication of a scene entry to a social networking site using an account associated with the device.

In another aspect, the invention is directed towards a non-transitory computer-readable medium, including instructions for causing a computing device to perform the above method.

In yet another aspect, the invention is directed towards a method for selecting scene clips, including: entering a target location into a smartphone; sending the target location to a server; and receiving and displaying on the smart phone at least one scene entry pertaining to the target location from the server, where the displayed scene entry indicates a name of an asset and an indication of a scene from the asset.

Implementations of the invention may include one or more of the following. The method may further include: sending a request to the server for a clip for the scene; receiving data for the requested clip; and displaying the clip through the smartphone. The entering a target location may include: receiving an image in the smart phone; and performing image recognition on the received image to determine a scene location associated with the received image, or transmitting the image to an image recognition server and receiving a scene location associated with the received image. The receiving an image in the smart phone may include capturing an image using a camera embedded in the smart phone or using a head-mounted or glasses mounted camera. The method may further include storing the scene location determined or received.

In another aspect, the invention is directed towards a non-transitory computer-readable medium, including instructions for causing a computing device to perform the above method.

In yet another aspect, the invention is directed towards a method for providing scene clips, including: receiving a specified location; determining at least one scene pertaining to the specified location; and transmitting at least one scene entry indicating the scene to a device, where the scene entry indicates a name of an asset and the scene from the asset and where the scene entry has an associated scene location.

Implementations of the invention may include one or more of the following. The invention may further include: receiving a request from the device for a clip for the scene; and arranging a display of the clip on the device. The specified location may be a current location of the device, a target location entered by a user, or the like. The arranging a display may include streaming or downloading the clip to the device.

In another aspect, the invention is directed towards a non-transitory computer-readable medium, including instructions for causing a computing device to perform the above method.

Advantages of certain implementations may include one or more of the following. Location information may be stored and retrieved for scenes from movies or other media. Scenes may be identified that correspond to provided location information, either a target location or a current location of the device as determined by GPS, or the like. Video clips may be provided that correspond to identified scenes. Movies or other media may be offered for sale associated with the identified clips and scenes, where the purchased products may be digitally streamed or downloaded, or provided by a retail outlet.

BRIEF DESCRIPTION OF THE DRAWINGS

FIG. 5 is a flowchart illustrating additional methods according to present principles.

FIG. 6 is a flowchart illustrating additional methods according to present principles.

DETAILED DESCRIPTION

Figure 1:
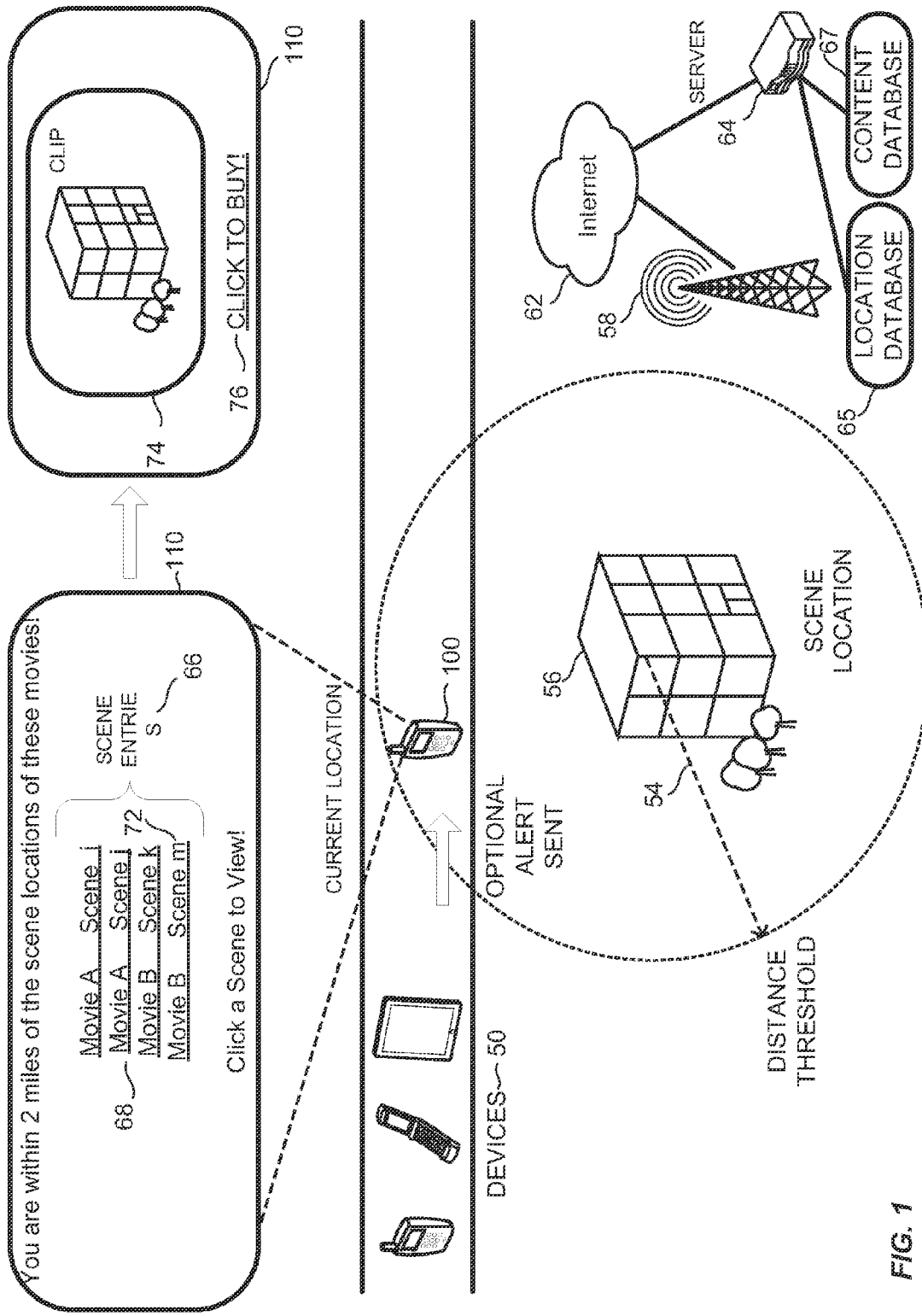
FIG. 1 is a schematic illustration portraying a use of systems and methods according to present principles.

Referring to the exemplary FIG. 1, in one example, a mobile device 100 running an application 110 such as an iOS or Android app identifies a current location of a mobile device using, e.g., GPS. The application 110 sends the location, i.e., the "current location", to a server 64 through an intermediate mobile network 58 and the Internet 62. The server 64 accesses a database 65 storing movie information and location information. The location information is associated with movies and scenes from movies based on where the movie scenes were shot or recorded or are otherwise associated, e.g., where a scene is said to take place. For example, each record includes a scene 56 and a scene location, e.g., a GPS value, for that scene. The database provides to the server one or more scenes corresponding to the location information, which are displayed within the application 110 as scene entries 66.

The application 110 may be configured to notify a user if a scene location is within a distance threshold 54 from the device 100. The application 110 may further be configured to alert a user if the device travels to within the distance threshold 54 from the scene location 56.

The server accesses a content database 67 and retrieves a video clip, or an indication of a clip, e.g., a thumbnail, for each scene. In another implementation, the location database and content database are combined and the server can receive video clips directly in response to submitting location information. The scene entries 66 may be viewed as a list of assets 68 and scenes within assets 72. Upon targeting and activating one of the scene entries, e.g., by clicking on the same, the server streams a clip 74 of the scene to the application 110 for presentation to the user. After presenting the clip(s), the application may present to the user an offer, e.g., link 76, to purchase or rent the entire movie. In another implementation, if there are clips from multiple movies, the user selects which clip(s) to view and may receive offers for purchasing each of the movies.

It will be understood that systems and methods according to present principles may be practiced by numerous types of devices 100, so long as the same are enabled to receive or determine location information and scene locations. Suitable such devices include smartphones, tablet computers, laptop computers, and the like.

There will also be understood many ways to use location information to identify movies or other content that relate to the address. In one example, a location database includes records for scenes from multiple movies. Such records may be gleaned from, e.g., records in film commission offices associated with each community. Each record also stores location information for each scene, such as GPS, street address, city, state, country, zip or postal code, latitude and longitude. The scene location can be the location where the scene was shot or recorded or where the scene is supposed to take place, or both. For example, a scene may depict events occurring in Chicago but the scene was actually recorded in Los Angeles, and the database can store both of these locations for the scene. The database can also have records for movies as a whole to indicate the principal location of shooting, or use a hierarchy of scenes of varying specificity, e.g., a sequence of scenes in the movie depicting events in Rome and using 30 minutes of movie time were all recorded in Vancouver.

Figure 2:
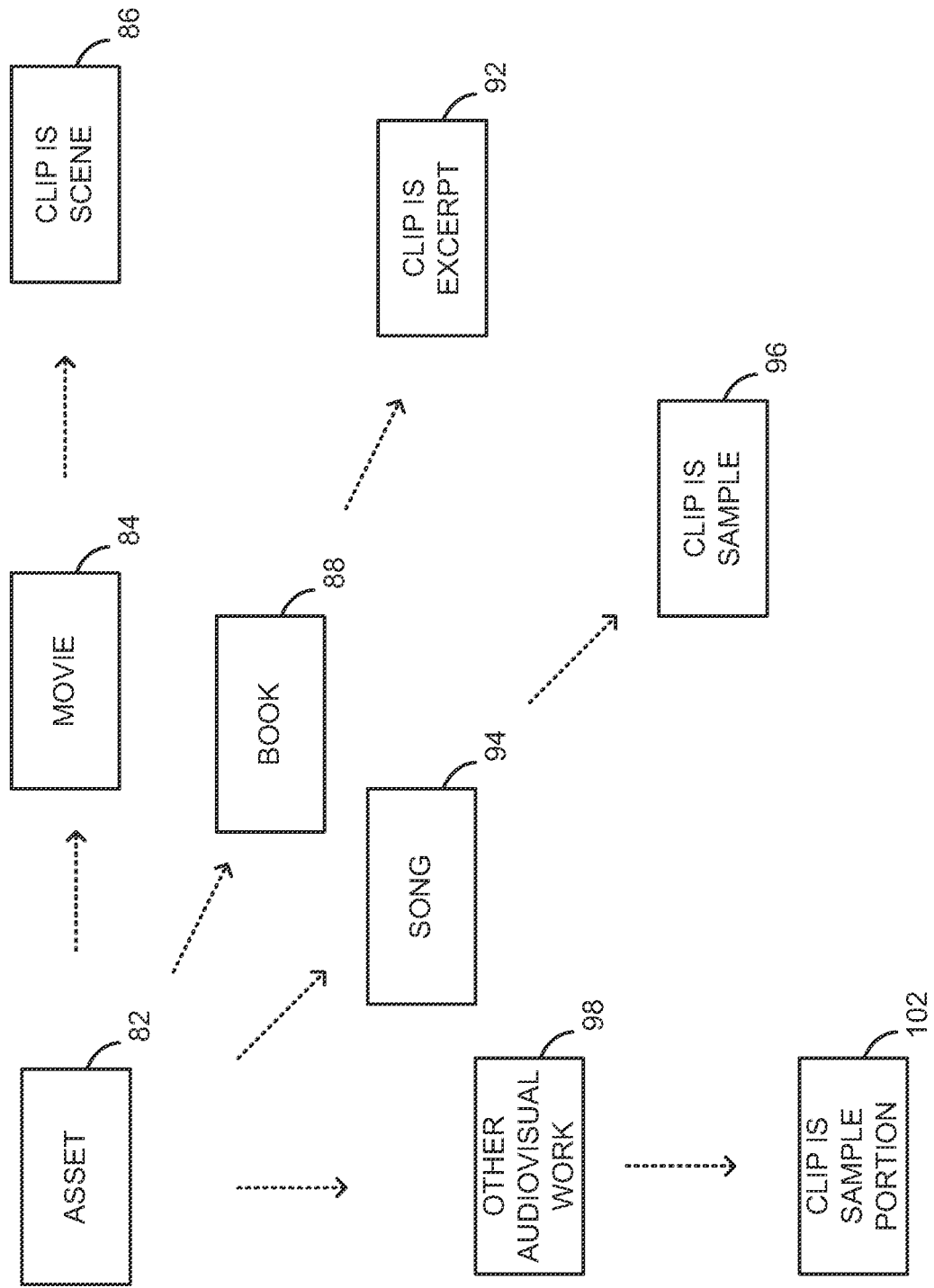
FIG. 2 indicates various types of assets or media products which benefit from systems and methods according to present principles.

FIG. 2 illustrates how the type of asset 82 may vary. In other words, while the description herein focuses on scenes (and clips 86) from movies 84, locations and scenes from other media can also be used. The asset may be a book 88, and the clip may be an excerpt 92 from the book. The asset may be a song 94, and the clip may be a sample 96 from the song. The asset may be other audiovisual works 98, and the clip may be a sample portion 102 from the other audiovisual work. In general, scenes and locations can be used from television programs, news programs, documentaries, video games, print media, internet media, internet videos (e.g., YouTube®), social network media (e.g., Facebook® pages or Twitter®), art, or historical information.

Figure 3:
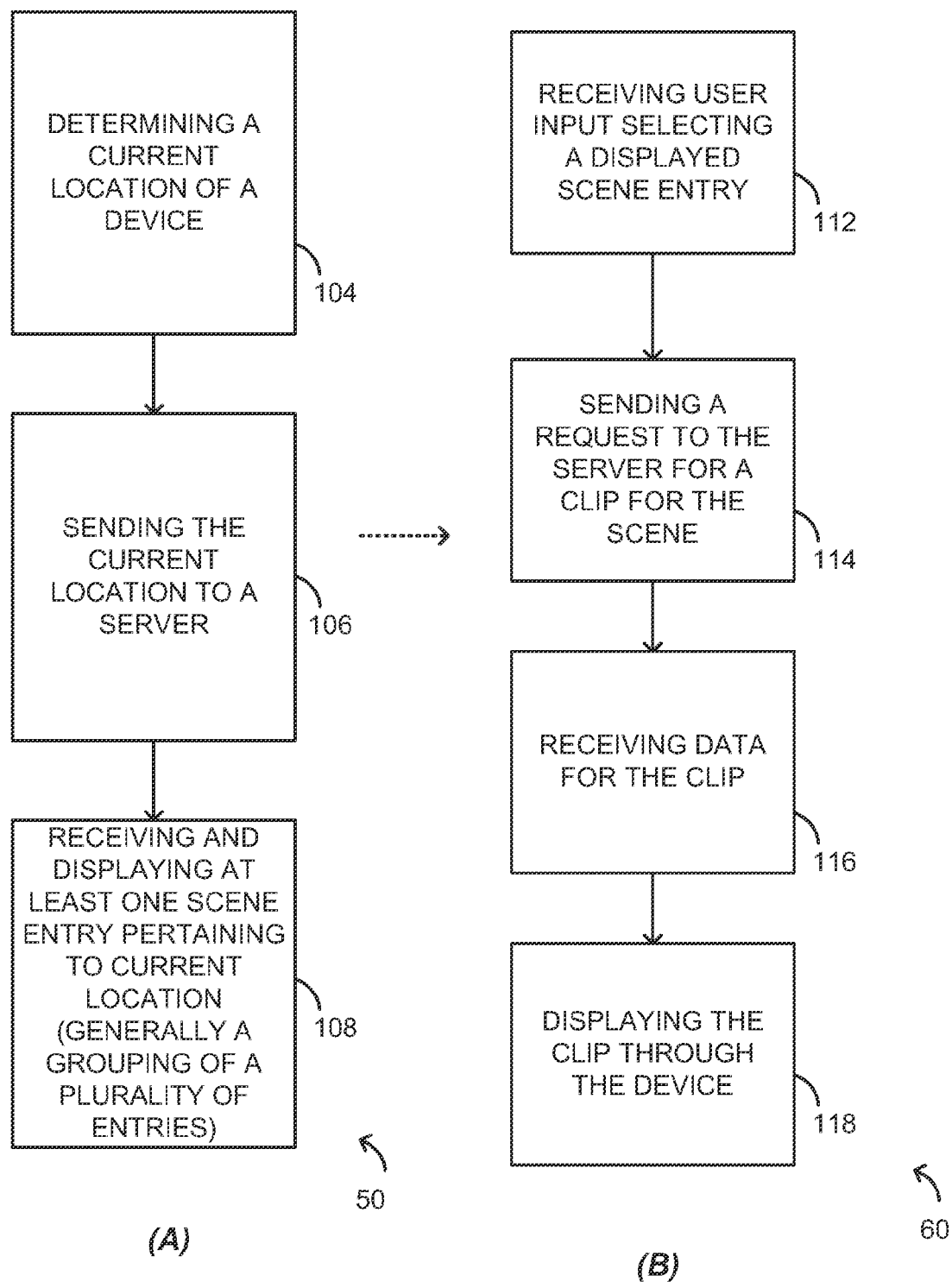
FIGS. 3(A) and 3(B) are flowcharts illustrating exemplary methods according to present principles.

FIG. 3(A) is a flowchart 50 of an exemplary method according to present principles. In a first step, a current location of the device is determined (step 104). The current location is then sent to a server (step 106). Following the sending step, at least one scene entry is received and displayed pertaining to the current location (step 108). Where a plurality of scene locations are proximate the current location, a grouping of the plurality may be displayed. The grouping may be by way of a list or map display as will be described.

FIG. 3(B) is a flowchart 60 illustrating steps that may be taken subsequent to those of the flowchart 50. In a first step, user input may be received selecting a displayed scene entry (step 112). In other words, the user may select a scene entry from those displayed on the user interface provided by the application on the mobile device. In some cases, if only one scene entry is displayed, this step may be omitted.

A next step is to send a request to the server for a clip from the selected scene (step 114). The clip may be of the entire scene or just a subset. Data may be received for the clip (step 116), and the clip may then be displayed through the device, and in particular the application thereon (step 118). The type of data received and its presentation or display will depend on the type of asset, as will the clip. FIG. 2 illustrates various types of assets.

Figure 4:
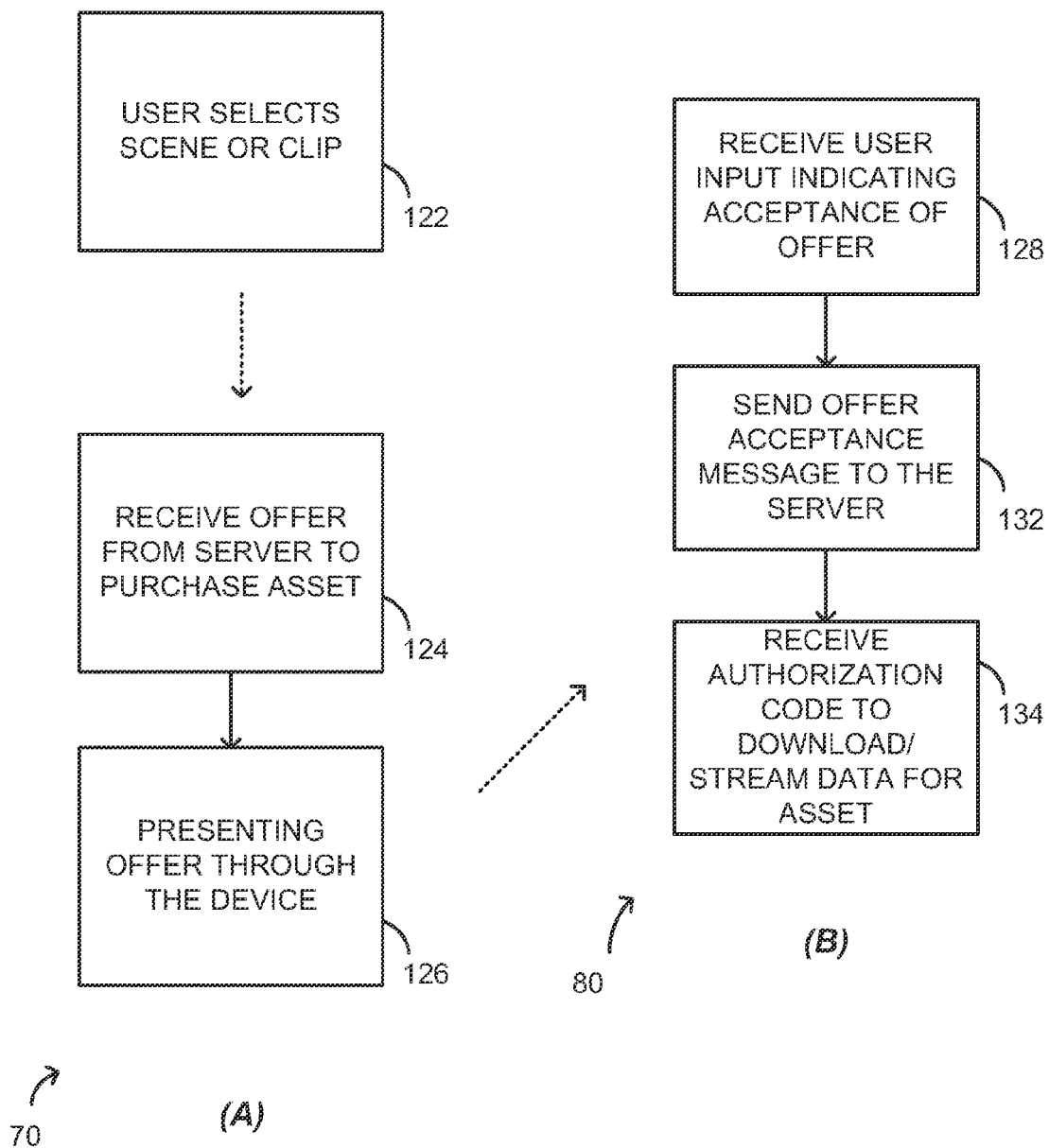
FIGS. 4(A) and 4(B) are flowcharts illustrating additional exemplary methods according to present principles, in particular, for providing media for sale following the provision of scene clips.

FIGS. 4(A) and 4(B) illustrate various e-commerce steps which may be employed following user selection of a scene or clip (step 122). For example, in flowchart 70, the mobile device may receive an offer from the server to purchase the asset associated with the presented clip (step 124). The offer may then be presented through the device (step 126). Continuing with flowchart 80, user input may be received indicating an acceptance of the presented offer (step 128). An offer acceptance message may be sent to the server (step 132), and an authorization code may be provided to the mobile device to download or stream data for the asset (step 134). It will be understood that various intermediate steps pertaining to e-commerce may also be provided, such as the provision of payment information, coupon codes, and the like, although such are not shown in the figure for clarity. It will also be understood that the application may work in conjunction with retail sites such as Amazon® or iTunes® to allow purchase of assets through such clearinghouse sites, as well as with content owners.

It will be understood that instead of or in addition to offering a purchase of the movie, the application may offer a coupon or discount for a future purchase, which may be for the movie, for related media or items, or for a different movie, e.g., from the same movie studio. Alternatively, or in addition to the movie clip, the application can request and provide information about the scene or location, such as trivia about actual events while shooting the particular scene. In yet another implementation, if a movie is still in theaters, the application can provide offers for ticket sales for the movie.

Referring to flowchart 90 of FIG. 5, in an alternative embodiment, following user selection of the clip (step 112), an indication of the scene entry or the scene location may be stored in a database (step 138). Storage in the database allows various other functionality to be provided, including re-presentation of historical trip data, post-visitation posting to social networking sites, rewards, and the like. Certain of these are discussed in greater detail below.

Referring to flowchart 110 of FIG. 6, following a step 108' of displaying a grouping of scene entries as a list, the entries may be ordered based on proximity to the current location or on advertising data on the device (step 144). In more detail, in one implementation, the grouping of results may be prioritized or filtered based on commercial or governmental sponsoring or advertising. Specific businesses may be identified based on their presence in scenes and/or their sponsoring of service, e.g., the diner featured in the television program Twin Peaks may be highlighted on a map. User activity may be correlated with location information to determine a reward or payment system, e.g., icon or link clicks, locations reached as determined by GPS, purchases, or social network activity within a time period. For example, within a certain time period, a user may click on an icon, post to a social networking site, visit the location, conduct a transaction at the location, and post again to a social networking site, and the user may then be rewarded for such actions. Where a user virtually visits a site, e.g., by visiting a website associated with the scene location, rewards may differ from the case where GPS is employed to verify that a user has actually visited a physical location of the scene.

As noted above, in one implementation, the application may provide a social networking component to inform others that the user has visited the scene location. The application can directly inform specified contacts from the smartphone's contact data, e.g., by email or text. The application can send an update to the user's account on a social networking service, such as Facebook® or Twitter®. Alternatively, the server handles the forwarding of information. Before posting the news, the application can offer the user an opportunity to augment or edit the post, or it can be fully automated, e.g., with settings configured by the user earlier. In another example, the user may be offered a reward for posting about the scene location, e.g., a discount to purchase the asset. In another example, the user may receive an award for capturing an image with a camera from the scene location and then posting the image. The reward may induce the user to post the image, which if properly cataloged also serves to identify the scene location with the asset. For any of the embodiments described, such "crowd-sourcing" of scene locations corresponding to assets may be a valuable source of metadata about the same.

Figure 7A:
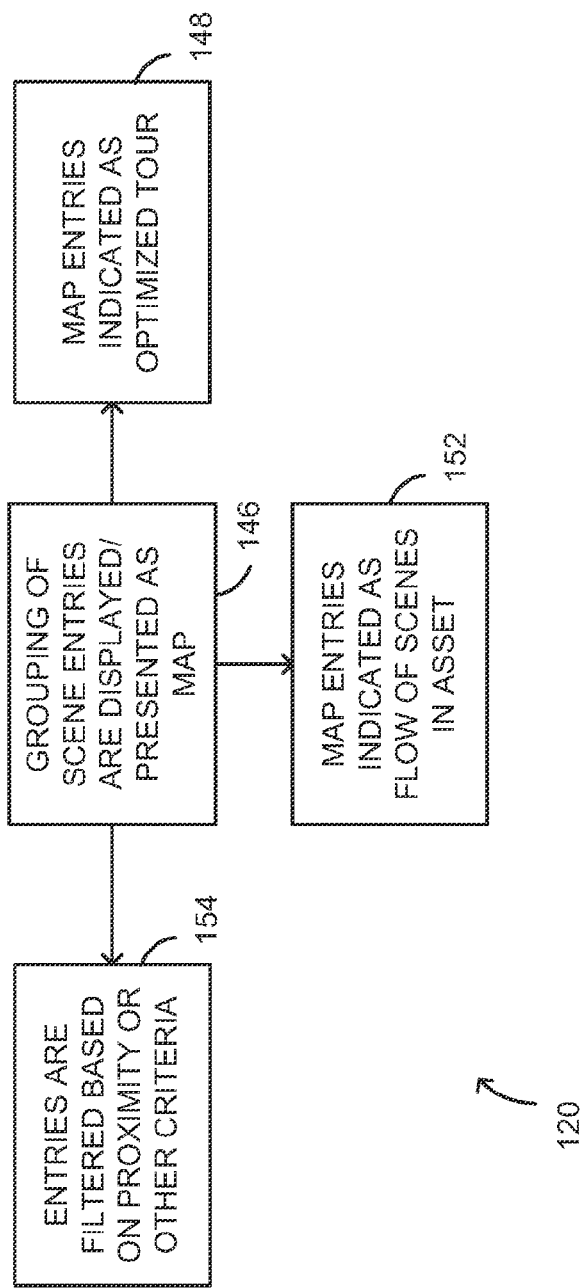
FIG. 7(A) is a flowchart illustrating additional methods according to present principles, in particular, for filtering displayed entries on a map.

Referring to flowchart 120 of FIG. 7(A), in an alternative implementation, the grouping of scene entries may be displayed or presented in a map format (step 146). Entries may be filtered based on proximity to the current location or other criteria (step 154).

Figure 7B:
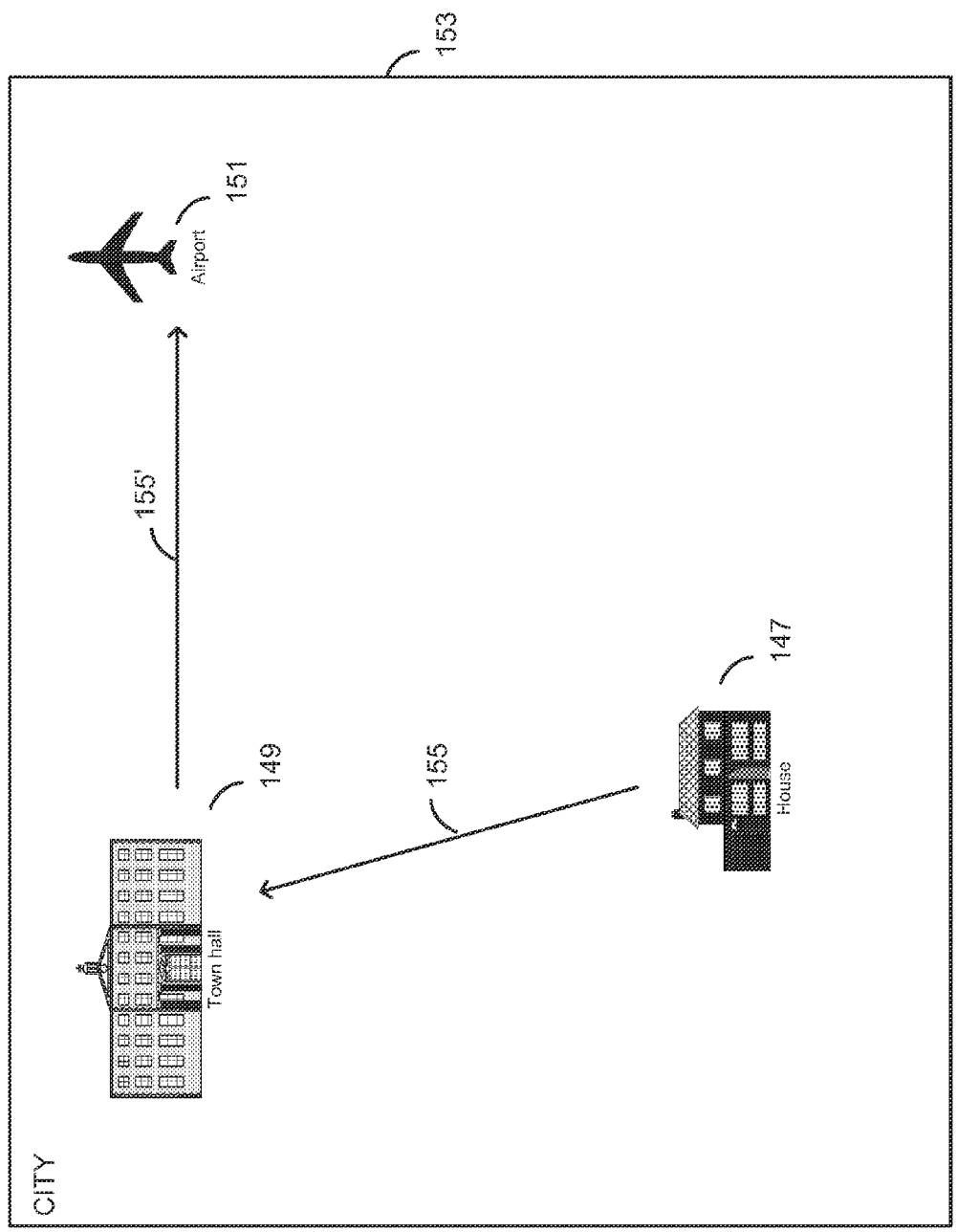
FIG. 7(B) is an exemplary map display according to present principles in which a tour between scene locations is laid out.

The map entries may be formatted so as to provide various functionality. For example, map entries may be indicated in such a way as to provide a tour of the various scene locations (step 148). The tour may be optimized to minimize total distance, or in other ways. For example, the tour map may only show locations which are currently open. The map entries may also indicate the flow of scenes in an asset (step 152). For example, referring to the map 153 of FIG. 7(B), arrows 155 and 155' may indicate the flow of scenes between scene locations of a house 147, a townhall 149, and an airport 151. For example, scenes in a movie may flow from a councilwoman leaving her house, going to a townhall, and then departing from an airport. The map may also indicate the significance of a scene location to a movie, e.g., how much of the movie was filmed at the scene location.

In one implementation using maps, the application regularly checks for nearby scenes and provides the locations to a map or navigation application on the smartphone so that when the user checks the map, e.g., to find a business or to check directions, movie scene locations will be available. In one example, the application and/or map application alerts the user when they are near a movie scene location. In another example, the user can employ the application and/or map application to find movie locations and get directions to those locations. For example, a user may be planning a trip to Paris and would like to know which movie scenes were filmed in Paris and where in Paris. The user can then build an itinerary of movie scene locations in Paris to visit in person while on the trip.

In more detailed implementations using maps, a server, or local software or system, may display a map with marked or highlighted locations corresponding to scenes or locations from a movie. For example, the scenes of a movie could be indicated as a series of numbered flags. In another example, the icons and map are animated to indicate the flow of the scenes, e.g., a first scene is marked with a large round dot over a city, then a line is progressively traced to the next scene represented by a new dot. In another example, the map and locations are fictional or combined fictional and nonfictional, to represent the world in the movie e.g., mapping the locations of events in a fantasy or science fiction movie on a map of the movie's world.

Figure 8:
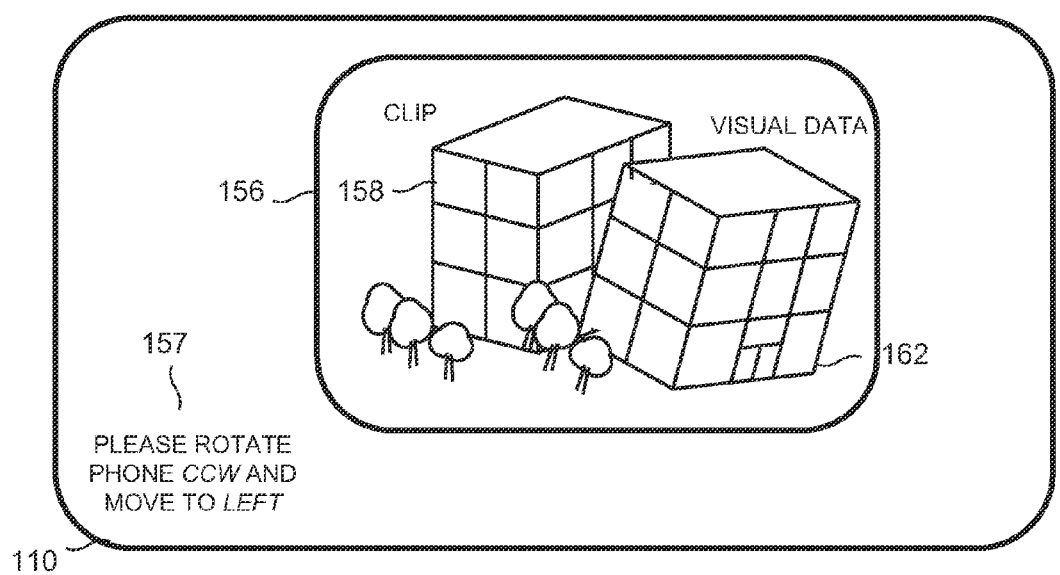
FIG. 8 is a schematic illustration portraying a use of additional systems and methods according to present principles.

In another implementation, scene clip images may be combined with visual data, e.g., from the mobile device's camera or from another source of visual data, e.g., the Google Glass® system. It is noted that wherever the term "camera" is employed in this description, the same may refer to a mobile phone camera, a separate camera in data communication with, e.g., a source of location data, a glasses system or head-mounted display, and the like. Referring to the schematic illustration of FIG. 8, a user interface 110 is illustrated with a window 156 showing a clip image 158 superposed with visual data 162, e.g., from a camera embedded on or coupled to the mobile device. Instructions 157 may also be seen. The instructions indicate to the user how to adjust the mobile device such that visual data from the camera matches corresponding objects from images in the clip. Such functionality allows a user to attempt to re-create a scene from a movie.

Figure 9:
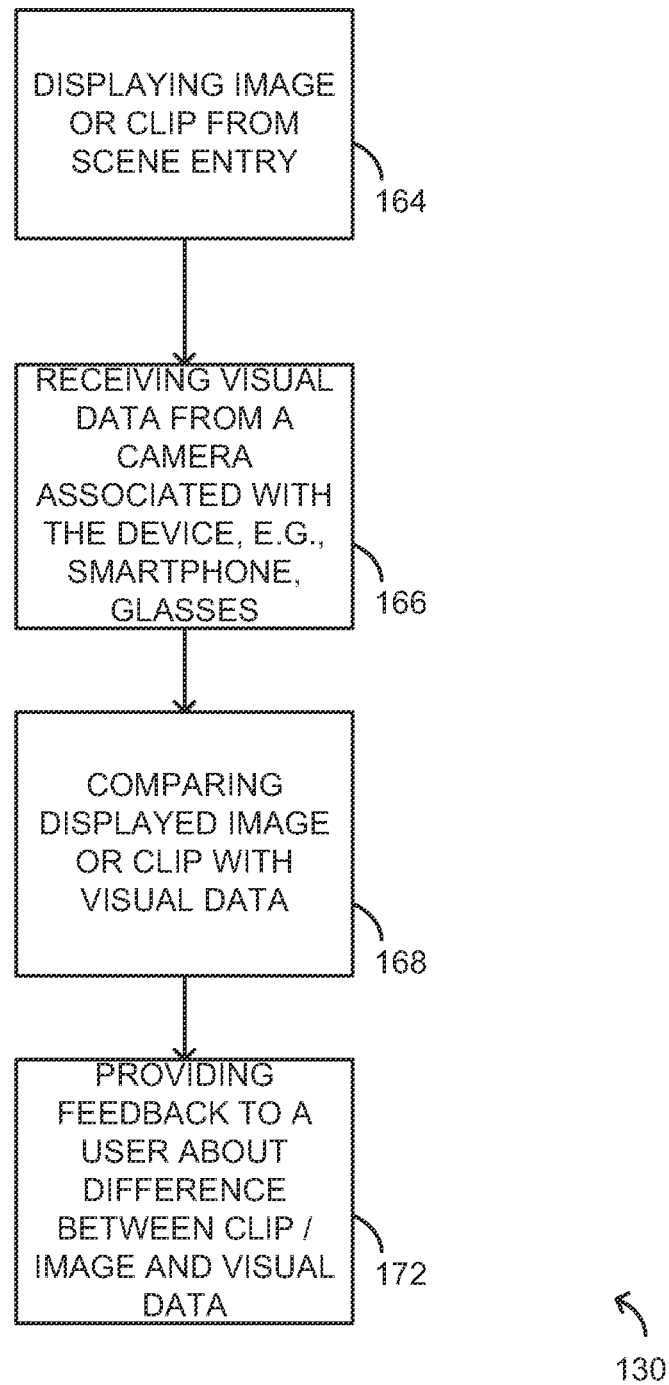
FIG. 9 is a flowchart illustrating additional methods according to present principles, e.g., using the device of FIG. 8.

In more detail, and also referring to the flowchart 130 of FIG. 9, after confirming a user's current location and that it matches a scene location from a movie, the server provides to a user an image or clip for that scene (step 164). The user then uses a camera or other visual data capture tool as noted above to attempt to view the same image with the camera (step 166). The camera, or the server, compares the presented image or clip with the visual data (step 168), and provides feedback to the user as the user adjusts the view of the camera until the current view and the movie scene/image match, e.g., to within a given tolerance (step 172). For example, the camera UI can indicate at the edges of the displayed view which direction the user should turn or move the camera or how to adjust zoom or other image characteristics to match the scene.

Figure 10:
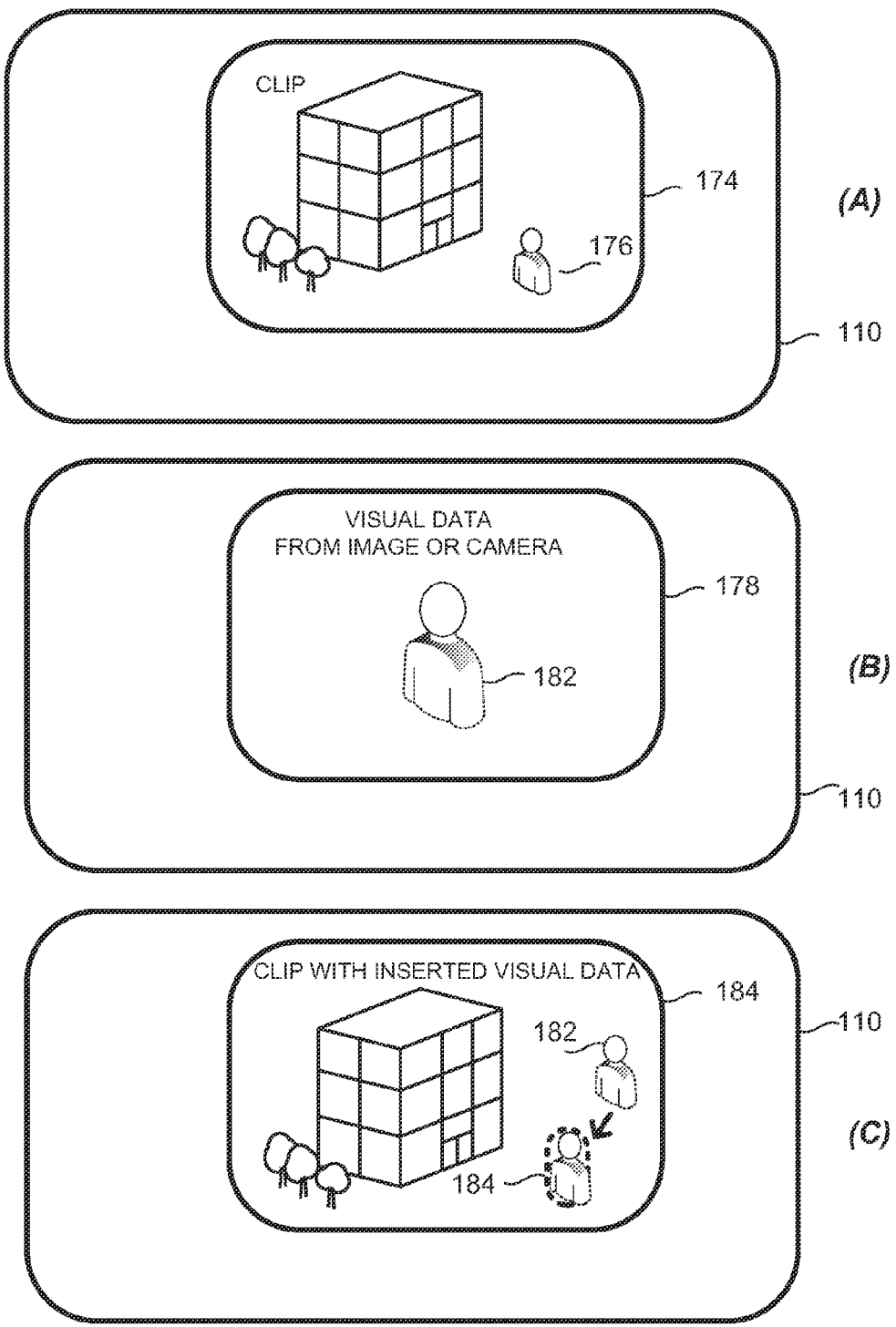
FIGS. 10(A)-10(C) are schematic illustrations portraying uses of additional systems and methods according to present principles.

In a related implementation, as seen in FIGS. 10(A)-10(C), a user can replace objects or actors from the movie scene with objects or people in the actual view while the camera or server helps guide the placement, e.g., using supplemental item information for locations and outlines, which could be created on a custom basis or automatically. For example, a user interface 110 of the application may portray in a window 174 a clip from a movie which includes a character 176. Also within the user interface 110, a window 178 may be provided by which visual data from a camera may be captured, e.g., the user 182, their friend, or the like. It is noted that in FIG. 10(B), visual data is indicated by dotted lines. It will be understood that the visual data may also be obtained from other image information stored on the camera or mobile device. As seen in FIG. 10(C), a superposition image or clip 184 may then be seen where the character 176 is replaced with the image 182 from the visual data, to make it appear that the visual data image appears in the clip. A dotted line indication 184 may be provided on the clip to help guide placement and sizing of the visual data image, especially in case the same requires resizing or repositioning.

As another example, if the movie scene depicts a car parked in front of a store, the user can park his own car in front of that store and the server will indicate to the user both how to match the camera view with the scene, e.g., to match street scene and store, and also how to position the user's car to be in the same position as the car in the movie scene e.g., displaying an outline of the movie car in the camera's user interface. A similar approach can be used to position people in the same locations and poses as actors in a movie scene. In another implementation, the user can superpose images from the movie scene onto the captured scene, e.g., actors, objects, buildings, or superpose parts of captured images onto the movie scene, e.g., to place a friend in a scene with a famous actor.

Figure 11:
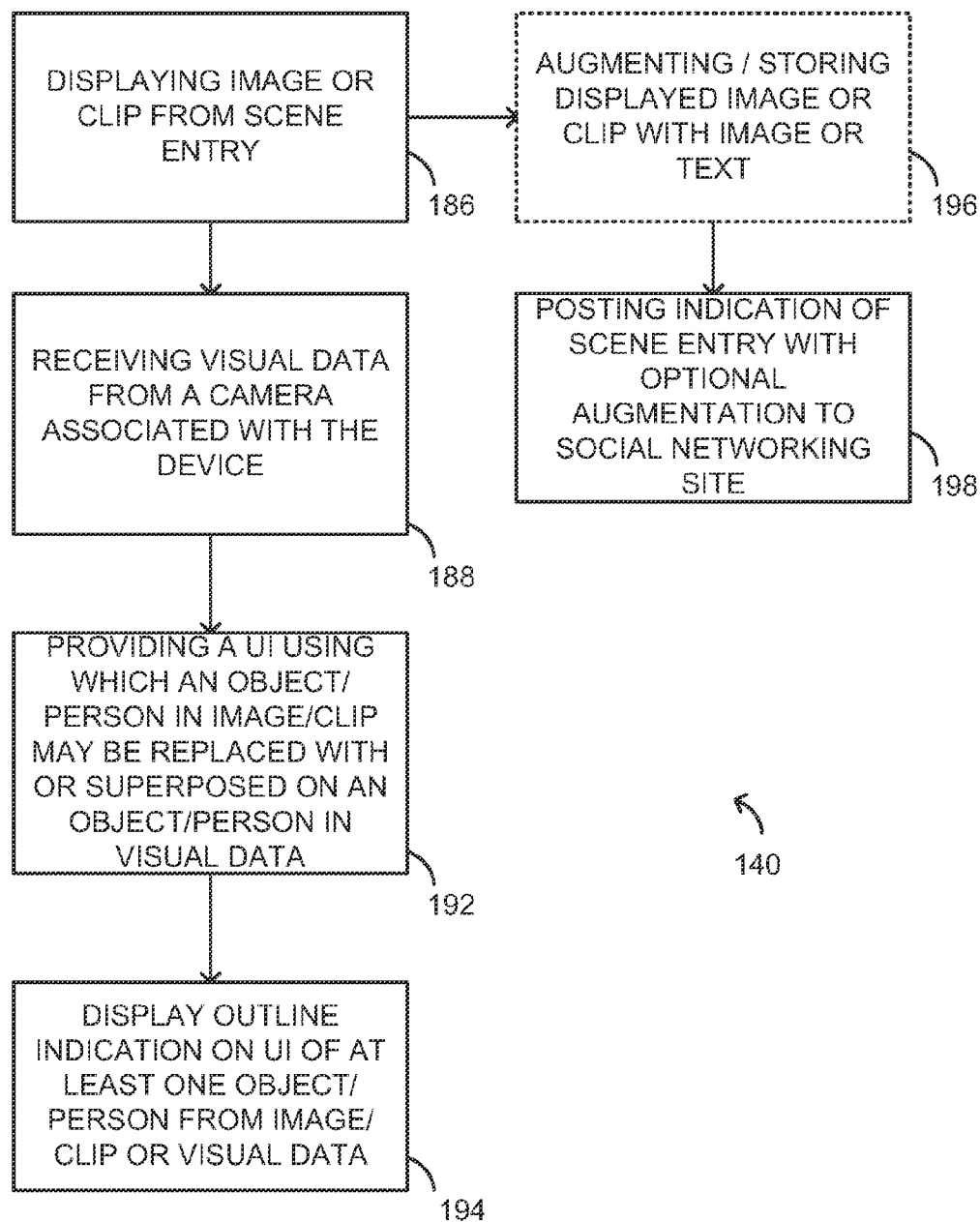
FIG. 11 is a flowchart illustrating additional methods according to present principles, e.g., using the device of FIG. 8.

Referring to the more general flowchart 140 of FIG. 11, an image or clip from a scene entry may be displayed or presented (step 186) on the user interface of an application running on a mobile device. Visual data from a camera associated with or otherwise coupled with the device may then be received (step 188). A user interface may then be provided using which an object or person in the image or clip may be replaced with or superposed on an object or person in the visual data (step 192). It will be understood that the user interface may also be employed to perform the opposite function, where objects or persons in the visual data are replaced with those in the image or clip. To assist in sizing and placement, an outline may be displayed indicating on the user interface at least one object or person from the image or clip or from the visual data (step 194). In this way, the superposed object may be more accurately sized and placed.

In a way similar to that disclosed above, the image or clip from the scene entry, or an image resulting from step 194, may be posted to a social networking site (step 198). The posting may be in combination with an indication of the scene entry, e.g., an indication of the asset. In some cases, the image or clip, or the superposed result, may be augmented with additional images or texts (step 196), e.g., an image of a user at the scene location or an entry detailing the user's trip to the scene location.

Figure 12:
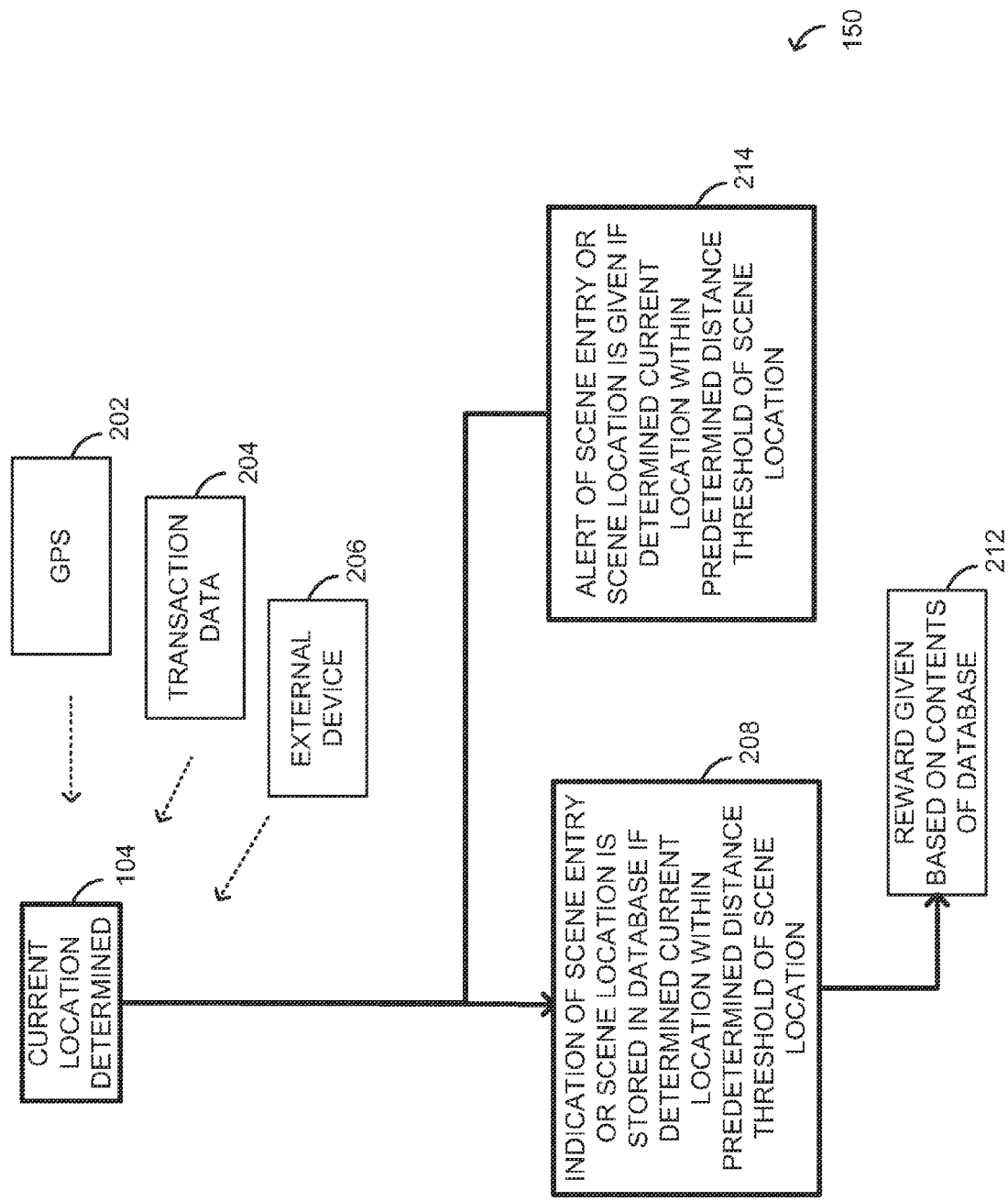
FIG. 12 is a flowchart illustrating additional methods according to present principles.

A current location may be identified in a number of ways. Referring to a flowchart 150 of FIG. 12, in one implementation, a current location may be determined of a device (step 104). The current location may be determined by GPS (step 202), or by various transaction data associated with the mobile device (step 204), e.g., where a user employs a mobile application associated with a retail site to purchase a product, or via an external device (step 206), e.g., an external GPS.

In more detail, there are many known ways to identify the location of a computer or mobile device. Examples include, but are not limited to, GPS, IP address, time zone, contact information, image analysis, and audio analysis. The system can send the information to the server directly or can first send the information to an identification server that will return specific location information, such as GPS, e.g., the system sends a street address or IP address to an identification server, and the same returns a GPS value. A user can also provide the location by direct input, e.g., typing in a city name, street address, GPS value, etc. The input location may be the user's current location (a "hard location") or any location of interest not the user's current location (a "soft location"). A location can be derived from activity or other data as well, such as from purchase activity, dinner or hotel reservations, calendar schedules, etc. The location information can also be provided to the main system by a separate device, such as from a car navigation system communicating with a mobile device, or a smartphone providing GPS information to a tablet.

Referring back to FIG. 12, indications of scene entries or locations pertaining to the current location may be stored in a database if the determined current location is within a predetermined distance threshold from the scene location (step 208). Rewards may then be given based on the contents of the database (step 212). In an alternative implementation, rewards may be provided to a user if the same clicks on a scene entry, even if the user is not present at the corresponding scene location. In another implementation, an alert may be provided (step 214), if a scene entry or scene location is within a predetermined distance threshold from the determined current location.

In another implementation implementing a reward system, users accumulate achievements or points for visiting movie scene locations. After identifying a nearby scene, the application may inform an achievement server that the user has visited the location for the identified scene. The achievement server has a record for the user, or creates a new one, and records the achievement. The user's achievement profile indicates the scene locations the user has visited. Over time, the user can receive additional achievements for completing collections of achievements. For example, the user can receive a meta-achievement for visiting all the locations from a movie. The achievements can also be tracked with points, e.g., each achievement having a point value. The achievement server or the application can also announce the completion of achievements to other people, e.g., to friends of the user or to other users of the achievement server, or to a social networking service, etc. As the user completes achievements or accumulates points, the user can receive rewards. In one example, if a user visits all the locations from a movie, the user receives a coupon for a discount on the purchase of the movie, e.g., via a digital download. In another example, after accumulating a certain number of points, e.g., 500 points, where each location visit is worth 5 points, the user receives a title within the achievement server community and receives a free download of a media item from a library authorized to the achievement server, e.g., movie images provided by content providers to the achievement server to be used as wallpaper or backgrounds on smartphone user interfaces.

Figure 13:
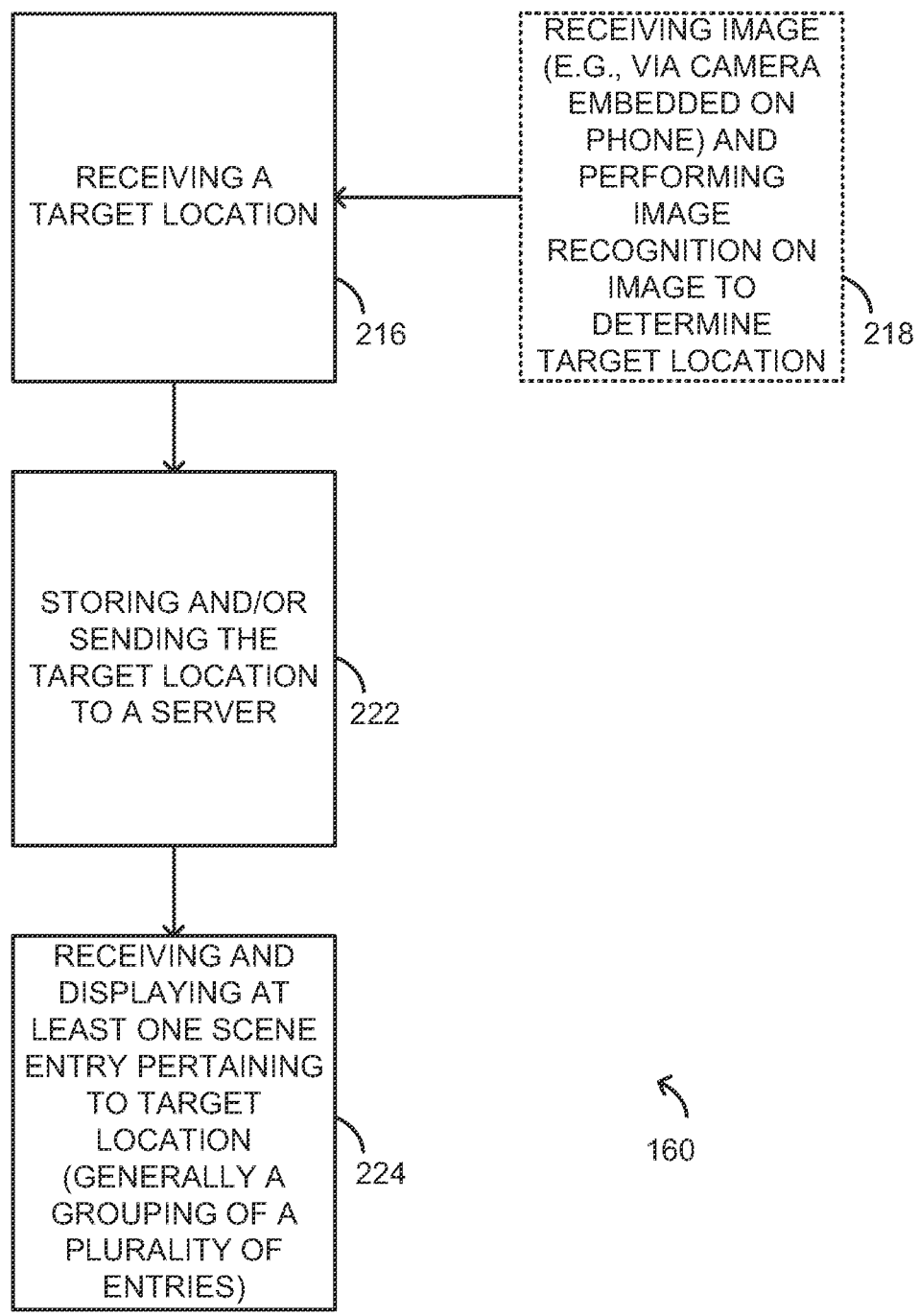
FIG. 13 is a flowchart illustrating additional methods according to present principles, e.g., where a target location is identified by, e.g., image recognition.

Referring to the flowchart 160 of FIG. 13, besides receiving current location information from the actual determined location of a mobile device, in other implementations the system may determine a target location from an image (step 216). That is, a target location may be determined using an image received from a camera embedded on or associated with a mobile device. In particular, image recognition may be performed on the received image to determine the target location (step 218).

The target location may be stored and/or sent to a server (step 222). One or more scene entries may then be received and presented pertaining to the target location (step 224). In some cases, a plurality of entries will be grouped and presented.

In more detail, a user may capture an image using a camera and may send the image to a server. The server accesses an image database and determines if there is a matching image or finds the closest image. The images in the image database may be images from movies, each image associated with a scene and movie. In another example, a user can provide any image to the server, such as an image captured previously, e.g., on vacation, or that the user received or accessed separately, e.g., downloaded from a news article. The image matching may be a helpful tool to build a location information database. When a user sends an image to find a matching image, the user can also send location information for the sent image, e.g., GPS from the camera. If there is a match, the server or the user sends the location information and image and/or scene information to a location database to store the location information for the scene, and thus potentially building up the database of images.

Figure 14:
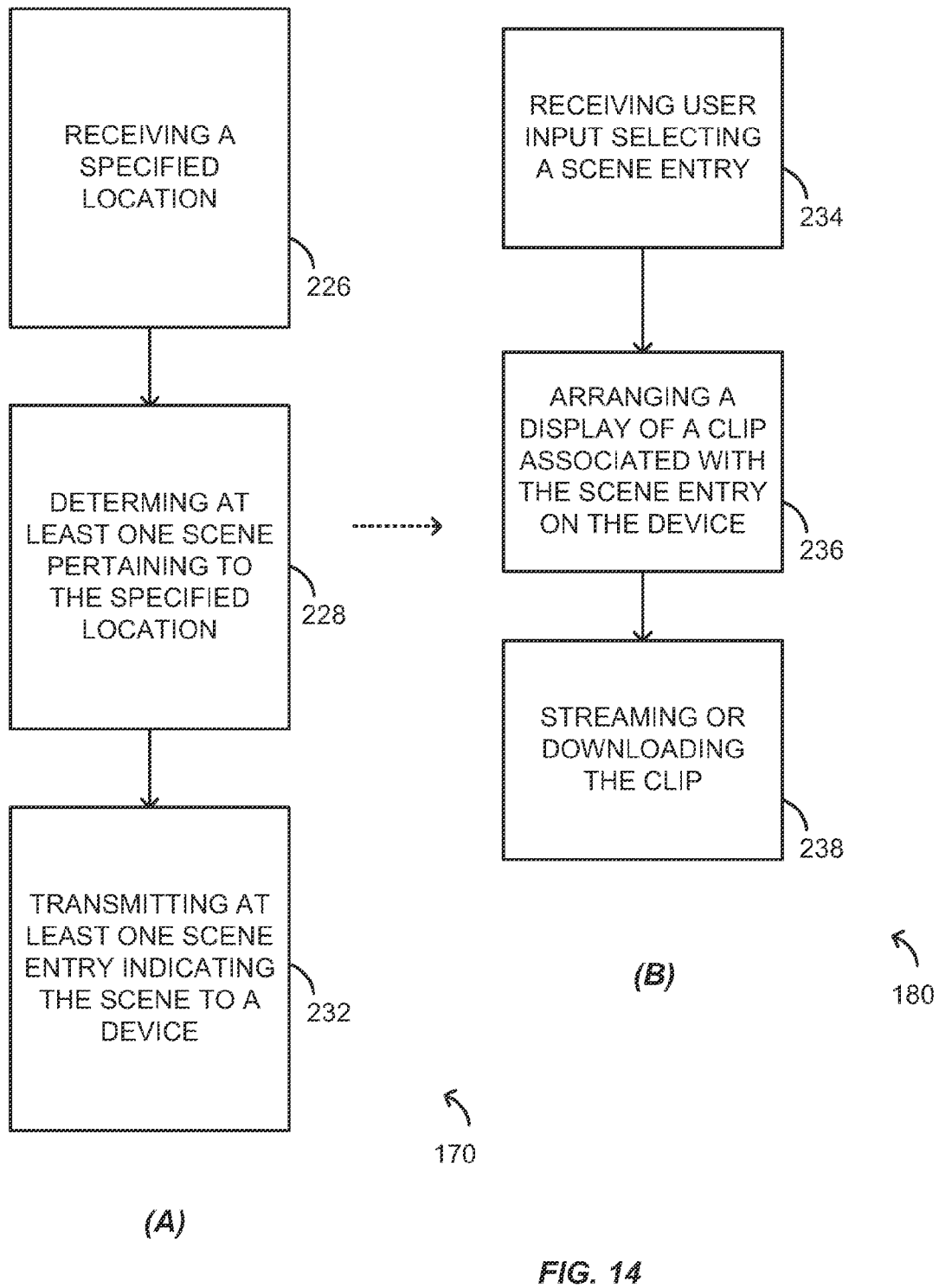
FIGS. 14(A) and 14(B) are flowcharts illustrating additional exemplary methods according to present principles, e.g., where a current location is replaced with a specified location.

Referring to FIGS. 14(A) and 14(B), another implementation according to present principles is illustrated by flowcharts 170 and 180, respectively, where the location of a user is not the current location or location determined by image recognition, but is simply specified by a user. A first step in the flowchart 170 is to receive a specified location (step 226). For example, a user may enter a ZIP code, GPS coordinates, address, or the like, into a search field. A server such as a location server determines at least one scene pertaining to the specified location (step 228). Such determining may include methods described above, including use of a predetermined distance threshold from the specified location. At least one scene entry is then transmitted indicating the found or determined scene to the device (step 232). Subsequent to the transmitting, and referring to the flowchart 180, the user may select a scene entry from the provided and displayed scene entries (step 234). A clip associated with the scene entry may then be arranged to be presented on the device (step 236). For example, the clip may be streamed or downloaded to the device (step 238). Variations may be seen, and the same will be similar to those above in which a current location was determined, e.g., by GPS, or where image recognition provided a target location.

What has been described are systems and methods for providing clips from scenes pertaining to assets such as movies where a user is near a scene location or enters the scene location in an application. In one implementation of the location system using GPS, a smartphone includes GPS functionality and provides current GPS data to an application that uses the GPS data to identify movie scenes having locations near the current location. Other implementations can use other devices, e.g., tablets, and other location mechanisms, as discussed above. The application sends the GPS data to a server which works with a location database to identify any corresponding scenes. The application can include a user-configurable distance threshold. The application then presents to the user any identified scenes. The application can present the scene entries as, e.g., as a list or using a graphical representation, such as a map with icons for the scenes. The user can search or apply or set up filters to only show desired movies, e.g., genre, actor, date ranges, director, etc. or locations.

One implementation includes one or more programmable processors and corresponding computer system components to store and execute computer instructions, such as to provide the application providing location information and presenting information to a user, the server identifying scenes, the location database, the content server, and the mobile device, e.g., smartphone, executing the application. One such computing environment is disclosed below.

Figure 15:
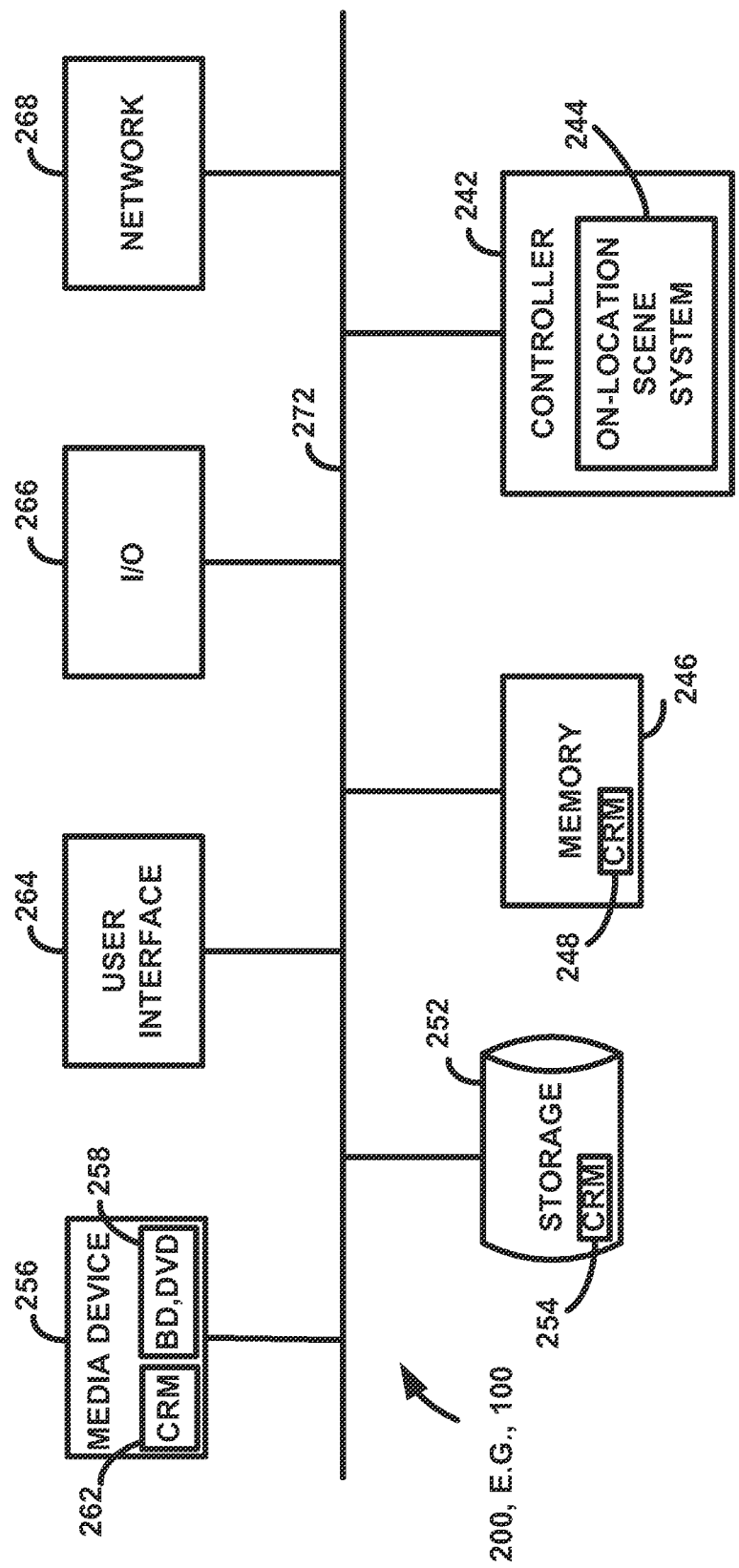
FIG. 15 illustrates an exemplary computing environment in which the methods according to present principles may be implemented.

Referring to FIG. 15, a representation of an exemplary computing environment 200 in which the system and method 244 may be implemented is illustrated.

The computing environment 200 includes a controller 242, a memory 246, storage 252, a media device 256, a user interface 264, an input/output (I/O) interface 266, and a network interface 268. The components are interconnected by a common bus 272. Alternatively, different connection configurations can be used, such as a star pattern with the controller at the center.

The controller 242 includes a programmable processor and controls the operation of an on-location scene system 244. The controller 242 loads instructions from the memory 246 or an embedded controller memory (not shown) and executes these instructions to control the system.

Memory 246, which may include non-transitory computer-readable memory 248, stores data temporarily for use by the other components of the system. In one implementation, the memory 246 is implemented as DRAM. In other implementations, the memory 246 also includes long-term or permanent memory, such as flash memory and/or ROM.

Storage 252, which may include non-transitory computer-readable memory 254, stores data temporarily or long-term for use by other components of the system, such as for storing data or instructions. In one implementation, the storage 252 is a hard disc drive or a solid state drive.

The media device 256, which may include non-transitory computer-readable memory 262, receives removable media and reads and/or writes data to the inserted media. In one implementation, the media device 256 is an optical disc drive or disc burner, e.g., a writable Blu-ray® disc drive 258.

The user interface 264 includes components for accepting user input, e.g., the user indication of locations or other aspects discussed above, and presenting a display, e.g., of clips or superposed images, to the user. In one implementation, the user interface 264 includes a keyboard, a mouse, audio speakers, and a display. The controller 242 uses input from the user to adjust the operation of the computing environment.

The I/O interface 266 includes one or more I/O ports to connect to corresponding I/O devices, such as external storage or supplemental devices, e.g., a printer or a PDA. In one implementation, the ports of the I/O interface 266 include ports such as: USB ports, PCMCIA ports, serial ports, and/or parallel ports. In another implementation, the I/O interface 266 includes a wireless interface for wireless communication with external devices. These I/O interfaces may be employed to connect to one or more content playback devices.

The network interface 268 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, the disclosed systems and methods can be applied to images from movies, television, video games, etc. Similarly, other variations are also possible and the invention is not limited only to the specific examples described above. Moreover, while a clip may be from a movie, e.g., Gone With The Wind, the content offered for sale may be another type of asset, e.g., the corresponding book by Margaret Mitchell. For example, various combinations of the interaction between the mobile device, the application, the servers, and the databases are possible and will be readily apparent to those of ordinary skill in the art. While the system and method have primarily been described in the context of mobile devices, the same may be advantageously employed in the navigational (or other) computer within an automobile or other vehicle. As noted above, scene locations may be determined in a number of ways, and stored as metadata, including at the time of filming using digital cameras with geolocation capabilities. Crowd sourcing is another tool for determining scene locations, as noted above, where a user recognizes a scene location of, e.g., a movie, and uploads a notation of the same associating the scene location, e.g., via latitude and longitude coordinates, with the movie asset. Accordingly, the present invention is not limited to only those implementations described above.

The invention claimed is:

1. A method of providing scene clips based on location, comprising:
   determining a location of a device;
   sending the determined location to a server;
   receiving and displaying at least one scene entry pertaining to the location from the server, wherein the displayed scene entry indicates a name of an asset and a scene from the asset and wherein the scene entry has an associated scene location;
   displaying an image or clip from the scene entry;
   receiving visual data from a camera associated with the device;
   comparing the displayed image or clip with the received visual data; and providing feedback to a user about the difference in position or orientation, or both, between at least one object in the received visual data and a corresponding object in the displayed image or clip, whereby as a user adjusts the camera position to adjust the visual data, a difference between the objects in the displayed image or clip and in the visual data is reduced.

2. The method of claim 1 wherein the determining a location of a device is performed by analysis of transaction information on the device.

3. The method of claim 1, wherein the displaying an image or clip from the scene entry further comprises:
a. sending a request to the server for a clip for the scene entry;
b. receiving data for the requested clip; and
c. displaying the clip through the device.

4. The method of claim 3, further comprising storing an indication of the scene entry or location for which a request is sent in a database.

5. The method of claim 3, wherein the sending is preceded by a step of receiving an input selecting a displayed scene entry.

6. The method of claim 3, wherein the asset is an audiovisual work, and the clip is streamed or downloaded to the device.

7. The method of claim 3, further comprising:
a. receiving an offer from the server to purchase the asset; and
b. presenting the offer through the device.

8. The method of claim 7, further comprising:
a. receiving user input indicating to accept the offer;
b. sending an offer acceptance message to the server; and
c. receiving an authorization code to download or stream data for the asset from a content server.

9. The method of claim 1, further comprising
providing a user interface configured to enable an object or a person in the displayed image or clip to be replaced with, or superposed upon, an object or a person imaged in the visual data, or vice-versa.

10. The method of claim 9, further comprising displaying an outline indication on the user interface of at least one object or person from the displayed image or clip or of at least one object or person from the visual data.

11. The method of claim 1, wherein the asset is selected from the group consisting of: television programs, news programs, documentaries, video games, Internet media, Internet videos, social network media, and artwork.

12. The method of claim 1, wherein the location of the device is determined using a GPS system of the device.

13. The method of claim 1, wherein the determining is performed by receiving location information from an external device.

14. The method of claim 1, wherein the displayed scene entries are ordered based on advertising data received by the device, the advertising data associated with the scene entry or location.

15. The method of claim 1, wherein the device is a smartphone or a tablet.

16. The method of claim 1, wherein the receiving and displaying steps further comprise receiving a grouping of scene entries pertaining to the current location from the server, wherein the grouping of scene entries indicates names of assets, receiving a selection from the grouping, and transmitting the selection to the server.

17. The method of claim 16, wherein the grouping is displayed as a list of scene entries or as a map indicating the locations.

18. The method of claim 17, wherein the list is ordered according to a flow of scenes in the asset, or wherein the map indicates the flow of scenes in the asset.

19. The method of claim 16, further comprising displaying the grouping with travel information or directions indicated between locations.

20. The method of claim 1, further comprising receiving a distance threshold, and wherein the displayed scene entries pertaining to the current location from the server are filtered based on the distance threshold.

21. The method of claim 20, further comprising displaying an alert if the device is or becomes separated from the location by a distance less than the distance threshold.

22. The method of claim 1, further comprising receiving a distance threshold, and further comprising storing an indication of the scene entry or scene location in a database if the device is less than the distance threshold from a location.

23. The method of claim 22, further comprising providing a reward based on the contents of the database.

24. The method of claim 16, further comprising receiving a filter indication, and wherein the grouping is filtered based on the filter indication.

25. The method of claim 24, wherein the filter indication is selected from the group consisting of: actor, genre, rating, director, location, and combinations of the above.

26. The method of claim 1, further comprising posting an indication of a scene entry to a social networking site using an account associated with the device.

27. A non-transitory computer-readable medium, comprising instructions for causing a computing device to perform the method of claim 1.

28. The method of claim 1, wherein the determining a location further comprises:
receiving an image in the smart phone;
performing image recognition on the received image to determine a location associated with the received image, or transmitting the image to an image recognition server and receiving a location associated with the received image.

29. The method of claim 28, wherein the receiving an image in the smart phone includes capturing an image using a camera embedded in the smart phone or using a head-mounted camera.

30. The method of claim 28, further comprising storing the location determined or received.

31. The method of claim 1, further comprising augmenting the displayed image or clip.

32. The method of claim 31, wherein the augmenting includes adding an image or text to the displayed image or clip.

* * * * *